US012638001B2

(12) United States Patent
Jørgensen et al.

(10) Patent No.: US 12,638,001 B2
(45) Date of Patent: May 26, 2026

(54) INTERLAYER, SPAR CAP AND WIND TURBINE BLADE

(71) Applicant: LM WIND POWER A/S, Kolding (DK)

(72) Inventors: Jeppe Jørgensen, Kolding (DK); Klavs Jespersen, Kolding (DK); Ole Nielsen, Kolding (DK)

(73) Assignee: LM WIND POWER A/S, Kolding (DK)

( * ) Notice: Subject to any disclaimer, the term of this patent is extended or adjusted under 35 U.S.C. 154(b) by 198 days.

(21) Appl. No.: 18/033,145

(22) PCT Filed: Nov. 25, 2021

(86) PCT No.: PCT/EP2021/083048
§ 371 (c)(1),
(2) Date: Apr. 21, 2023

(87) PCT Pub. No.: WO2022/112445
PCT Pub. Date: Jun. 2, 2022

(65) Prior Publication Data
US 2023/0400009 A1 Dec. 14, 2023

(30) Foreign Application Priority Data

Nov. 26, 2020 (GB) ..................................... 2018596

(51) Int. Cl.
*F03D 1/06* (2006.01)
*B29C 70/08* (2006.01)
(Continued)

(52) U.S. Cl.
CPC ............ *F03D 1/0681* (2023.08); *B29C 70/08* (2013.01); *B29C 70/228* (2013.01); *B29C 70/48* (2013.01);
(Continued)

(58) Field of Classification Search
CPC ................ F03D 1/0681; F05B 2230/23; F05B 2280/6003; B29C 70/08; B29C 70/228;
(Continued)

(56) References Cited

U.S. PATENT DOCUMENTS

| | | | | | | |
|---|---|---|---|---|---|---|
| 4,786,541 | A | * | 11/1988 | Nishimura | ............ | B29C 70/228 428/113 |
| 2011/0164987 | A1 | * | 7/2011 | Grabau | ................... | F03D 1/065 416/230 |

(Continued)

FOREIGN PATENT DOCUMENTS

| | | | |
|---|---|---|---|
| EP | 0193478 | A1 | 9/1986 |
| EP | 2543499 | A1 | 1/2013 |

(Continued)

*Primary Examiner* — Nathaniel E Wiehe
*Assistant Examiner* — Aye S Htay
(74) *Attorney, Agent, or Firm* — Nath, Goldberg & Meyer; Jerald L. Meyer; Tanya E. Harkins

(57) ABSTRACT

A flow-enhancing fabric extends in a longitudinal direction and in a transverse direction. The fabric includes a plurality of fibre layers including a first fibre layer and a second fibre layer arranged upon each other, the first fibre layer has a first plurality of fibre bundles oriented in parallel in a first fibre direction and has a plurality of first glass fibre bundles and a number of first carbon fibre bundles. The second fibre layer has a second plurality of fibre bundles oriented in parallel in a second fibre direction different from the first direction and has a plurality of second glass fibre bundles and a number of second carbon fibre bundles. At least a number of first carbon fibre bundles intersect and contact a number of second carbon fibre bundles. The fabric has a plurality of monofilaments arranged between the first and second fibre layer along the transverse direction.

21 Claims, 6 Drawing Sheets

(51) Int. Cl.

| | |
|---|---|
| *B29C 70/22* | (2006.01) |
| *B29C 70/48* | (2006.01) |
| *B29C 70/54* | (2006.01) |
| *B29C 70/88* | (2006.01) |
| *B29D 99/00* | (2010.01) |
| *B29K 105/08* | (2006.01) |
| *B29K 307/04* | (2006.01) |
| *B29K 309/08* | (2006.01) |
| *B29L 31/08* | (2006.01) |

(52) U.S. Cl.
CPC .......... *B29C 70/547* (2013.01); *B29C 70/882* (2013.01); *B29D 99/0028* (2013.01); *B29K 2105/0809* (2013.01); *B29K 2307/04* (2013.01); *B29K 2309/08* (2013.01); *B29K 2995/005* (2013.01); *B29L 2031/085* (2013.01); *F05B 2230/23* (2013.01); *F05B 2280/6003* (2013.01)

(58) Field of Classification Search
CPC ..... B29C 70/48; B29C 70/547; B29C 70/882; B29D 99/0028; B29K 2105/0809; B29K 2307/04; B29K 2309/08; B29K 2995/005; B29L 2031/085

See application file for complete search history.

(56) References Cited

U.S. PATENT DOCUMENTS

| | | | | |
|---|---|---|---|---|
| 2012/0177872 | A1* | 7/2012 | Tsai ........................... | B32B 5/28 |
| | | | | 428/113 |
| 2014/0119936 | A1* | 5/2014 | Dahl ....................... | F01D 5/282 |
| | | | | 264/263 |
| 2015/0048555 | A1* | 2/2015 | Nagasaki ................ | B29B 11/16 |
| | | | | 428/138 |
| 2016/0138569 | A1* | 5/2016 | Caruso .................. | F03D 1/0633 |
| | | | | 156/60 |
| 2016/0221272 | A1* | 8/2016 | Koefoed, ............... | F03D 80/30 |

FOREIGN PATENT DOCUMENTS

| | | | |
|---|---|---|---|
| EP | 2687356 | A1 | 1/2014 |
| WO | 2017144449 | A1 | 8/2017 |
| WO | 2020103990 | A1 | 5/2020 |

* cited by examiner

A

B

C

INTERLAYER, SPAR CAP AND WIND TURBINE BLADE

This is a National Phase Application filed under 35 U.S.C. 371 as a national stage of PCT/EP2021/083048, filed Nov. 25, 2021, an application claiming the benefit of Great Britain Application No. 2018596.3, filed Nov. 26, 2020, the content of each of which is hereby incorporated by reference in its entirety.

The present disclosure relates to a flow-enhancing fabric. The present disclosure also relates to a spar cap comprising the flow-enhancing fabric as an interlayer, and to a wind turbine blade comprising such a spar cap.

BACKGROUND

Wind power provides a clean and environmentally friendly source of energy. Wind turbines usually comprise a tower, generator, gearbox, nacelle, and one or more rotor blades. The wind turbine blades capture kinetic energy of wind using known airfoil principles. Modern wind turbines may have rotor blades that exceed 100 metres in length.

Wind turbine blades are usually manufactured by forming two shell parts or shell halves from layers of fibre and resin. Spar caps or main laminates are placed or integrated in the shell halves and may be combined with shear webs or spar beams to form structural support members. Spar caps or main laminates may be joined to, or integrated within, the inside of the suction and pressure halves of the shell.

As the size of wind turbine blades increases, various challenges arise from such blades being subject to increased forces during operation, requiring improved reinforcing structures. The manufacturing of large reinforcing structures, such as spar caps or spar beams, is likewise challenging, in particular when precured, carbon fibre-reinforced spar caps are used as the reinforcing members. Carbon fibres are typically lighter than glass fibres by volume and have improved tensile and compressive strength. However, laminate defects, such as voids, wrinkles or misaligned fibres, may have disadvantageous effects on mechanical properties.

Carbon pultrusions consist of unidirectional carbon fibres embedded in a matrix material. Thus, carbon pultrusions are strong and stiff in the longitudinal direction, but relatively weak and compliant in the transverse direction. Typically, a wind turbine blade with a spar cap comprises several carbon pultrusions stacked on top of each other. When stacking pultrusions, interlayer material is placed in-between the carbon pultrusions. Then the spar cap is resin infused to bond the carbon pultrusions to each other. During and after blade resin infusion, the interlayer material has multiple purposes, such as enhancing resin flow between the carbon pultrusions.

An optimized interlayer between carbon pultrusions should provide: good adhesion between carbon pultrusions, i.e. high fracture toughness, lightning properties, i.e. high electrical conductivity, strength and good permeability. Different candidates for interlayer materials have been suggested in literature. However, none of them fulfil all the requirements for an optimized interlayer, and selection of the interlayer material is a trade-off between different characteristics (adhesion, permeability, structural, lightning). Thus, there is a need for improved interlayers in the wind turbine industry.

SUMMARY

It is an object of the present disclosure to provide a flow-enhancing fabric that provides improved performance over the prior art. Particularly, it is an object of the present invention to provide a spar cap comprising the flow-enhancing fabric as an interlayer between two precured fibre-reinforced elements, and to provide a wind turbine blade comprising such a spar cap.

Thus, in a first aspect, the present invention relates to a flow-enhancing fabric extending in a longitudinal direction and in a transverse direction, the fabric comprising a plurality of fibre layers including a first fibre layer and a second fibre layer arranged upon each other, the first fibre layer comprising a first plurality of fibre bundles oriented in parallel in a first fibre direction and comprising a plurality of first glass fibre bundles and a number of first carbon fibre bundles, and the second fibre layer comprising a second plurality of fibre bundles oriented in parallel in a second fibre direction different from the first direction and comprising a plurality of second glass fibre bundles and a number of second carbon fibre bundles, so that at least a number of first carbon fibre bundles intersect and contact a number of second carbon fibre bundles, and the fabric further comprises a plurality of monofilaments arranged between the first and second fibre layer along the transverse direction of the fabric, the plurality of monofilaments each having a mutual spacing between them.

The arrangement of carbon fibre bundles in the flow-enhancing fabric is advantageous for several reasons, when the flow-enhancing fabric is used as an interlayer in a spar cap. First, the carbon fibre bundles provide electrical conductivity to the fabric in the transverse direction. Secondly, the physical intersection between the first and second carbon fibre bundles at intersection points also provides a conductive path through the thickness of the fabric. When the flow-enhancing fabric is arranged between two pultruded carbon elements in a spar cap, the carbon fibres of the flow-enhancing fabric provides a conductive path between the two carbon elements sandwiching the flow-enhancing fabric and further provides potential equalisation between the two carbon elements. In this way, the flow-enhancing fabric protects the carbon elements against lightning strikes and flashovers.

The arrangement of monofilaments between the first and second fibre layers, along the transverse direction of the fabric, provides good permeability properties to the fabric. This is because, when the first and second fibre layers are pressed together around the monofilaments, a void on each side of the monofilaments will be present, due to the mutual spacing between the monofilaments, allowing fluid to flow into the void and through the flow-enhancing fabric, in particular in the direction of the monofilaments along the transverse direction. Thus, when the flow-enhancing fabric is arranged between two pultruded carbon elements in a spar cap, and the structure is resin infused, the resin can flow through the void adjacent to the monofilaments, because the monofilaments may substantially retain their cross-sectional shape while the resin is wetting the fibre reinforcement stack. The permeability can be adjusted by tailoring the spacing between the monofilaments and/or by adjusting the diameter of the monofilaments to get a larger void.

In some embodiments, an angle between each of the first and second fibre directions relative to the longitudinal direction of the fabric is in the range of 20-70 degrees, preferably 45 degrees. In some embodiments, an angle between the first and second fibre directions are between 70-110 degrees, preferably 90 degrees. By having the glass fibre bundles and the carbon fibre bundles arranged in this way, the transverse failure strength, i.e. tensile transverse strength and stiffness of the spar cap with carbon pultrusions, is improved.

In some embodiments, the glass fibre bundles are glass fibre rovings comprising a plurality of glass fibres. In some embodiments, the carbon fibre bundles are carbon fibre tows, comprising a plurality of carbon fibres.

In some embodiments, the first and/or second fibre layers comprise(s) alternating glass fibre bundles and carbon fibre bundles. In some embodiments, the first and/or second fibre layer comprises a carbon fibre bundle for every Xth glass fibre bundle, wherein X is in the range of 2-50, such as 2-10 preferably between 2-10.

In some embodiments, at least some of the fibres in the fabric are stitched and/or weaved together with one or more threads, such that the fibre bundles, including the first and second glass fibre bundles as well as the first and second carbon fibre bundles, and the monofilaments are maintained relative to each other by a stitching pattern. The fabric may comprise a plurality of stitching rows for maintaining arrangement of the plurality of fibres, the plurality of stitching rows includes a first stitching row arranged along a first stitch direction. Alternatively, or in addition thereto, at least some of the fibres in the fabric are maintained relative to each other by a binder. In some embodiments, the binder is neoxil.

Even though the present disclosure describes a first and second fibre layer arranged upon each other and comprising a plurality of monofilaments arranged between the two layers, the fabric need not to be manufactured by making the first and second fibre layer first and then arranging them on top of each other with the monofilaments in between. The fabric may also be made by arranging all the fibre bundles as desired, before stitching and/or weaving and/or binding them together to maintain the desired arrangement.

In some embodiments, the monofilaments are polymeric filaments, preferably thermoplastic monofilaments, such as polyester filaments, polypropylene filaments, polyethylene filaments, PET filaments, glass or other synthetic material. Preferably, the monofilaments and the glass fibres in the glass fibre bundles preferably have substantially the same thermal expansion. In some embodiments, the monofilaments are conductive material such as carbon fibres, copper fibres or steel fibres. This enhances the electrical conductivity further and still provides good permeability transversely. The important feature is that the monofilaments substantially keep its cross-sectional shape while the resin is wetting the material.

While preferred embodiments are described with reference to carbon fibres, these may in alternative embodiments, within the scope of the present disclosure, be replaced by or mixed with other conductive fibres, such as steel fibres.

The first fibre layer has a first upper fibre surface and a first lower fibre surface. In the same way, the second fibre layer has a second lower fibre surface and a second upper fibre surface. In some embodiments, the first fibre layer and a second fibre layer are arranged upon each other such that at least part of the first lower fibre surface is in contact with the second upper fibre surface. Preferably, the only parts of the first lower fibre surface that are not in contact with the second upper fibre surface are the areas surrounding the monofilaments.

The fabric has an upper fabric surface and a lower fabric surface. The upper fabric surface and the lower fabric surface may be defined as the two largest surfaces of the flow-enhancing fabric. The upper fabric surface may be opposite the lower fabric surface. In some embodiments, the first upper fibre surface is the upper fabric surface, and the second lower fibre surface is the lower fabric surface. In other embodiments, the second upper fibre surface is the upper fabric surface, and the first lower fibre surface is the lower fabric surface.

In some embodiments, the area weight of the flow-enhancing fabric is in the range of 50-500 g/m^2, preferably in the range of 100-300 g/m^2, such as 100-250 g/m^2. When the flow-enhancing fabric is used in a spar cap, this area weight is before resin infusion.

In some embodiments, the thickness of the flow-enhancing fabric, when resin infused, is in the range of 0.2 mm-0.5 mm, such as 0.3 mm.

In a preferred embodiment, the average monofilament diameter of the fibre rovings are at most 50 micrometres, preferably at most 25 micrometres, even more preferably at most 20 micrometres.

In another preferred embodiment, the average diameter of the monofilaments is between 100 and 1000 micrometres, preferably between 150 and 500 micrometres, e.g. around 250 micrometres or 350 micrometres.

The mutual spacing between the monofilaments is preferably between 1000 micrometres and 5000 micrometres, preferably between 1500 micrometres and 3500 micrometres, even more preferably between 2000 micrometres and 2500 micrometres.

In a second aspect, the present invention relates to a spar cap for a wind turbine blade comprising a plurality of precured fibre-reinforced elements including a first precured fibre-reinforced element and a second precured fibre-reinforced element, wherein a flow-enhancing fabric according to the first aspect of the present invention is arranged between the first precured fibre-reinforced element and the second precured fibre-reinforced element. The plurality of precured fibre-reinforced elements preferably comprise an electrically conductive material, e.g. electrically conductive reinforcement fibres, such as carbon fibres.

In some embodiments, each of the plurality of precured fibre-reinforced elements have a length in the longitudinal direction, a width in the transverse direction, and a height in a thickness direction, wherein the length is longer than the width and the width is longer than the height. The length may be more than 20 meters, such as more than 40 meters, such as more than 70 meters. The width may be between 20-200 mm, such as between 50-150 mm, such as 100 mm. The height may be between 2-10 mm, such as 5 mm.

Each of the plurality of precured fibre-reinforced elements, may have a lower surface and an upper surface extending in the longitudinal direction and the transverse direction. Each of the plurality of elements, such as each of the plurality of precured fibre-reinforced elements, may have a first side surface and a second side surface extending in the longitudinal direction and the thickness direction. Each of the plurality of elements, such as each of the plurality of precured fibre-reinforced elements, may have a first end surface and a second end surface extending in the width direction and the thickness direction. A flow-enhancing fabric may be arranged between the plurality of precured fibre-reinforced elements, to separate all the precured fibre-reinforced elements from each other. The flow-enhancing fabric may be arranged between the precured fibre-reinforced elements in a width direction (horizontal). However, it may also be arranged between the precured fibre-reinforced elements in a thickness direction (vertical).

The first precured fibre-reinforced element has a lower surface and an upper surface extending in the longitudinal direction and the transverse direction, and the second precured fibre-reinforced element has a lower surface and an upper surface extending in the longitudinal direction and the transverse direction.

The first precured fibre-reinforced element and the second precured fibre-reinforced element are arranged such that the lower surface of the first precured fibre-reinforced element is facing the upper surface of the second precured element, the flow-enhancing fabric is being arranged between the lower surface of the first precured fibre-reinforced element and the upper surface of the second precured element.

The first precured fibre-reinforced element and the second precured fibre-reinforced element may be adjacent elements in the thickness direction or the first in the width direction.

In some embodiments, the flow-enhancing fabric is arranged such that the longitudinal direction of the flow-enhancing fabric is substantially parallel with the length of the spar cap and the transverse direction of the flow-enhancing fabric is substantially parallel with the width of the spar cap.

In preferred embodiments, the precured fibre-reinforced elements are pultruded carbon elements.

In a third aspect, the present invention relates to a wind turbine blade comprising a spar cap according to the second aspect of the present invention. The wind turbine blade may comprise two spar caps according to the spar cap as disclosed herein. For example, the wind turbine blade may comprise a first spar cap in a first blade shell part and a second spar cap in a second blade shell part. The first spar cap may be a pressure side spar cap of a pressure side blade shell part. The second spar cap may be a suction side spar cap of a suction side blade shell part.

Method of manufacturing a spar cap for a wind turbine blade according to the second aspect of the present invention, comprising the steps of:

providing a plurality of precured fibre-reinforced elements and a plurality of flow-enhancing fabrics according to the first aspect of the present invention;

arranging the plurality of precured fibre-reinforced elements to provide a desired spar cap structure, wherein the plurality of flow-enhancing fabrics are arranged between the plurality of precured fibre-reinforced elements to enhance resin flow between the plurality of precured fibre-reinforced elements;

infusing the spar cap structure with resin; and curing the resin to form the spar cap.

In some embodiments, the spar cap is made in a spar cap mould and the method further comprises the steps of:

providing a spar cap mould, the spar cap mould comprising a moulding surface; and arranging the plurality of precured fibre-reinforced elements in the spar cap mould and stacking them to provide a desired spar cap structure, wherein the plurality of flow-enhancing fabrics are arranged between the plurality of precured fibre-reinforced elements to enhance resin flow between the plurality of precured fibre-reinforced elements.

In some embodiments, the spar cap is made directly in a blade shell member mould.

In some embodiments, the step of infusing the spar cap structure with resin is vacuum-assisted resin transfer moulding (VARTM).

In preferred embodiments, the precured fibre-reinforced material is pultruded carbon elements.

Method of manufacturing a wind turbine shell member comprising a spar cap according to the second aspect of the present invention, comprising the steps of:

providing a blade shell member mould comprising a moulding surface and a moulding cavity;

arranging a number of fibre-reinforced elements, such as fibre layers, within the blade shell member mould;

arranging a spar cap according to the first aspect of the present invention on a spar cap area of the fibre-reinforced elements;

infusing the blade moulding cavity with resin; and curing the resin to form the blade shell member.

In some embodiments, the spar cap is a pre-manufactured spar cap manufactured as described above.

In some embodiments, the spar cap is not pre-manufactured but is laid up directly in the blade mould.

In some embodiments, the step of infusing the blade moulding cavity with resin is vacuum-assisted resin transfer moulding (VARTM).

In preferred embodiments, the precured fibre-reinforced material is pultruded carbon elements.

In some embodiments, the fibre-reinforced elements are layers of glass fibre-reinforced plastic (GRP) or carbon fibre-reinforced plastic (CRP) or a combination thereof. These elements together form the primary part of the blade shell members.

The resin used may be a thermosetting or thermoplastic resin, preferably a thermosetting resin. In an embodiment of the invention, the thermosetting resin is selected from an ester-based resin, such as an unsaturated polyester resin, a vinyl ester resin or a urethane (meth)acrylate resin. In another embodiment, the resin may be a thermoplastic resin, such as nylon, PVC, ABS, polypropylene or polyethylene. In a preferred embodiment, the resin comprises a polyester, such as an unsaturated polyester. An unsaturated polyester resin may be cured by free radicals which are formed when organic peroxides decompose. The decomposition initiates a reaction by which unsaturated polyester molecules polymerize with styrene forming a three-dimensional structure.

It will be understood that any of the above-described features may be combined in any embodiment of the invention. In particular, features and embodiments described with regard to the fabric may also apply to the spar cap, the wind turbine blade and the method of manufacturing the spar cap and wind turbine blade and vice versa.

BRIEF DESCRIPTION OF THE FIGURES

Embodiments of the disclosure will be described in more detail in the following with regard to the accompanying figures. The figures show one way of implementing the present disclosure and are not to be construed as being limiting to other possible embodiments falling within the scope of the attached claim set.

DETAILED DESCRIPTION

Figure 1:
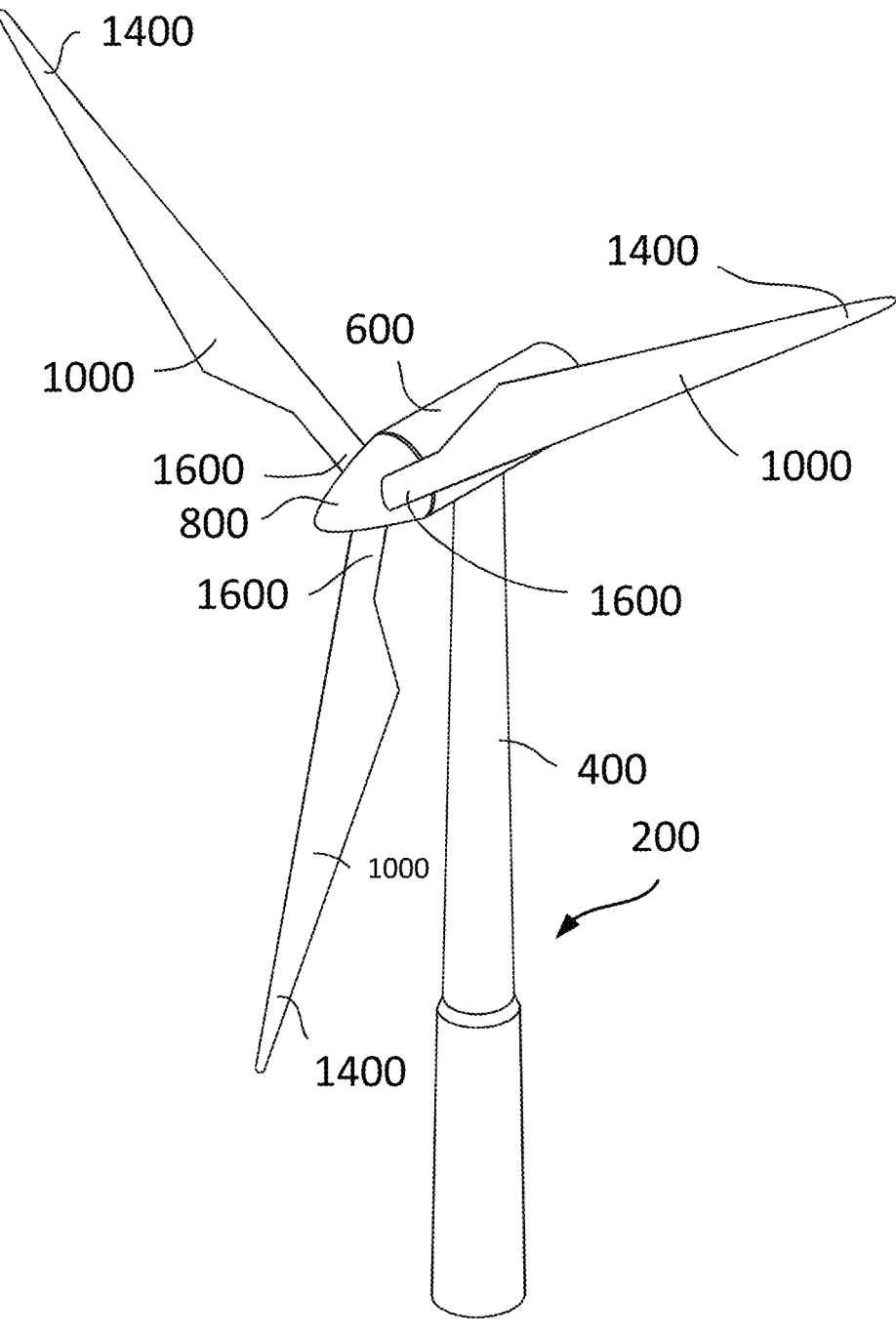
FIG. 1 is a schematic diagram illustrating a wind turbine.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

FIG. 1 illustrates a conventional modern upwind wind turbine according to the so-called "Danish concept" with a tower 400, a nacelle 600 and a rotor with a substantially horizontal rotor shaft. The rotor includes a hub 800 and three blades 1000 extending radially from the hub 800, each having a blade root 1600 nearest the hub and a blade tip 1400 furthest from the hub 800.

FIG. 2A shows a schematic view of a first embodiment of a wind turbine blade 1000. The wind turbine blade 1000 has the shape of a conventional wind turbine blade and comprises a root region 3000 closest to the hub, a profiled or an airfoil region 3400 furthest away from the hub and a transition region 3200 between the root region 3000 and the airfoil region 3400. The blade 1000 comprises a leading edge 1800 facing the direction of rotation of the blade 1000, when the blade is mounted on the hub, and a trailing edge 2000 facing the opposite direction of the leading edge 1800.

The airfoil region 3400 (also called the profiled region) has an ideal or almost ideal blade shape with respect to generating lift, whereas the root region 3000 due to structural considerations has a substantially circular or elliptical cross-section, which for instance makes it easier and safer to mount the blade 1000 to the hub. The diameter (or the chord) of the root region 3000 may be constant along the entire root region 3000. The transition region 3200 has a transitional profile gradually changing from the circular or elliptical shape of the root region 3000 to the airfoil profile of the airfoil region 3400. The chord length of the transition region 3200 typically increases with increasing distance r from the hub. The airfoil region 3400 has an airfoil profile with a chord extending between the leading edge 1800 and the trailing edge 2000 of the blade 1000. The width of the chord decreases with increasing distance r from the hub.

A shoulder 4000 of the blade 1000 is defined as the position, where the blade 1000 has its largest chord length. The shoulder 4000 is typically provided at the boundary between the transition region 3200 and the airfoil region 3400.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

FIG. 2B is a schematic diagram illustrating a cross-sectional view of an exemplary wind turbine blade 1000, e.g. a cross-sectional view of the airfoil region of the wind turbine blade 1000. The wind turbine blade 1000 comprises a leading edge 1800, a trailing edge 2000, a pressure side 2400, a suction side 2600, a first spar cap 7400, and a second spar cap 7600. The wind turbine blade 1000 comprises a chord line 3800 between the leading edge 1800 and the trailing edge 2000. The wind turbine blade 1000 comprises shear webs 4200, such as a leading edge shear web and a trailing edge shear web. The shear webs 4200 could alternatively be a spar box with spar sides, such as a trailing edge spar side and a leading edge spar side. The spar caps 7400, 7600 may comprise carbon fibres while the rest of the shell parts 2400, 2600 may comprise glass fibres.

Figure 3:
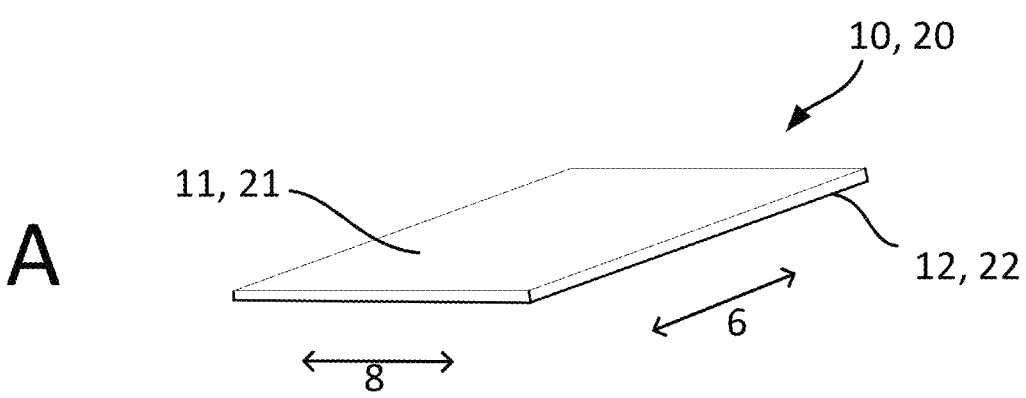
FIG. 3 is a schematic diagram illustrating a first or second fibre layer according to an embodiment of the present invention.
Figure 3:
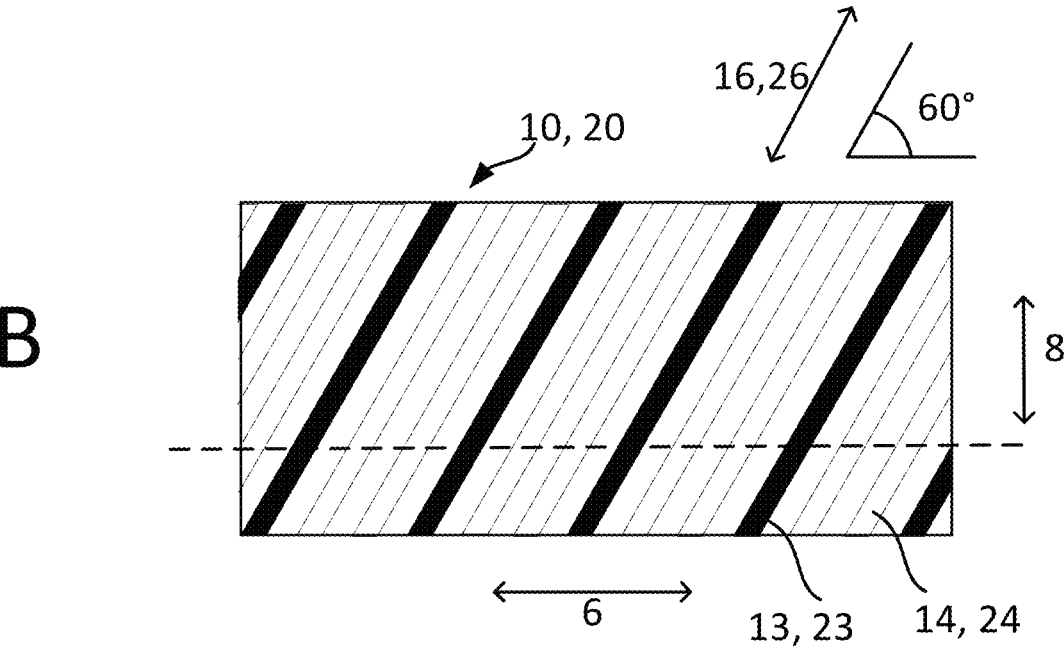
Figure 3:
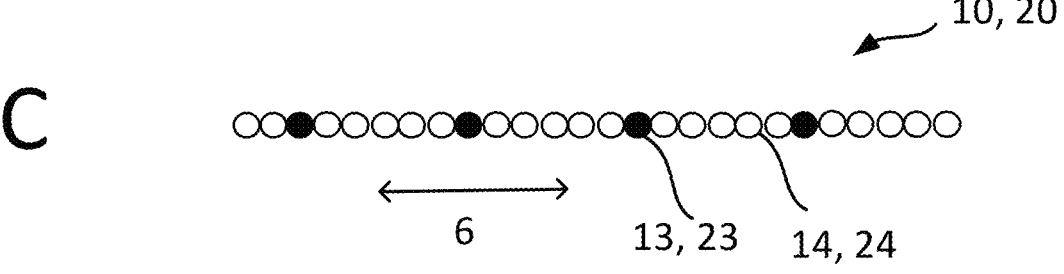

FIG. 3 is a schematic diagram illustrating an embodiment of a first or second fibre layer 10, 20 configured to form part of a flow-enhancing fabric 1 according to the present invention. FIG. 3A illustrates a three-dimensional view, FIG. 3B illustrates a top view and FIG. 3C illustrates a cross-sectional view along the dotted line illustrated in FIG. 3B.

The fibre layer 10, 20 extends in a longitudinal direction 6 and in a transverse direction 8. The fibre layer 10, 20 comprises a plurality of fibre bundles 13, 14, 23, 24 oriented in parallel in a fibre direction 16, 26. The white fibre bundles are glass fibre bundles 14, 24 and the black fibre bundles are carbon fibre bundles 13, 23. In FIGS. 3A and 3B, the fibre layer 10, 20 comprises a carbon fibre bundle 13, 23 for every fifth glass fibre bundle 14, 24. However, the number of glass fibre bundles 14, 24 relative to carbon fibre bundles 13, 23 may be different in other embodiments. The angle between the fibre direction 16, 26 relative to the longitudinal direction 6 of the fabric is preferably around 45 degrees. However, it may be between 10-80 degrees. In FIG. 3B the angle is 60 degrees.

Even though not visible in FIG. 3, the different fibres in the fabric may be maintained relative to each other by stitching and/or use of a binder and/or weaving.

Figure 4:
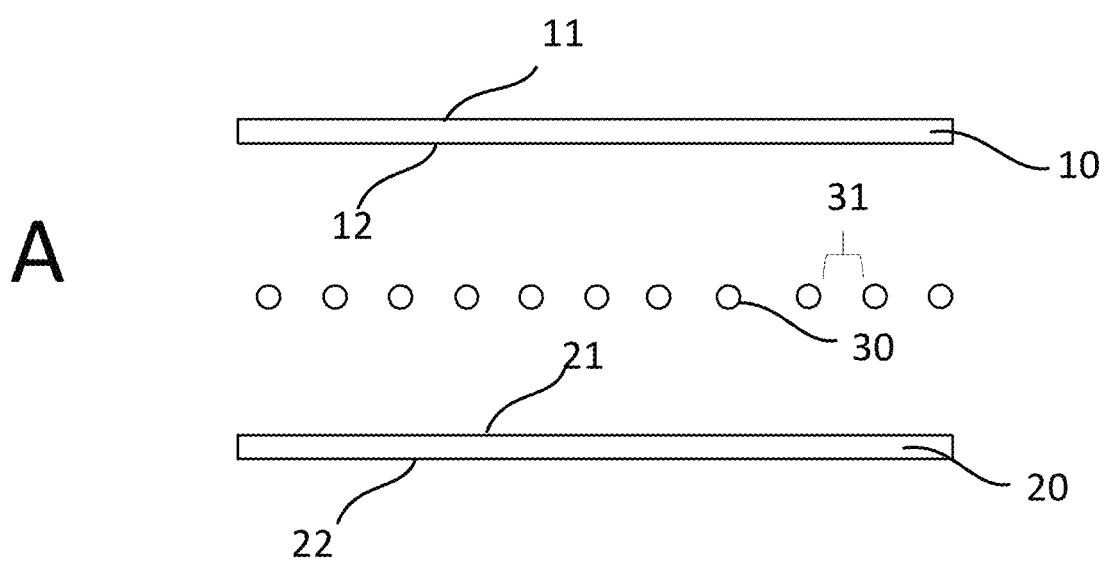
FIG. 4 is a schematic diagram illustrating a flow-enhancing fabric according to an embodiment of the present invention.
Figure 4:
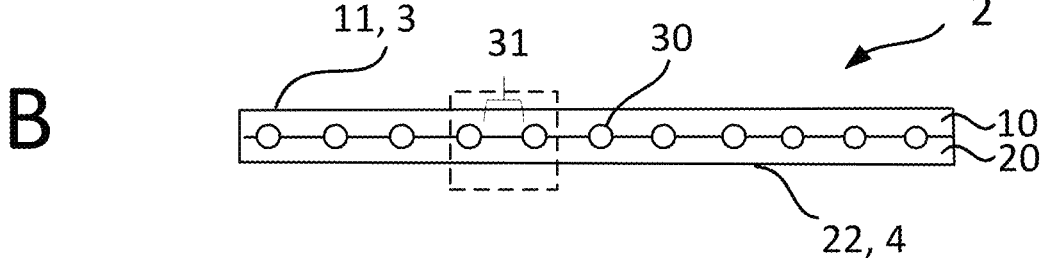
Figure 4:
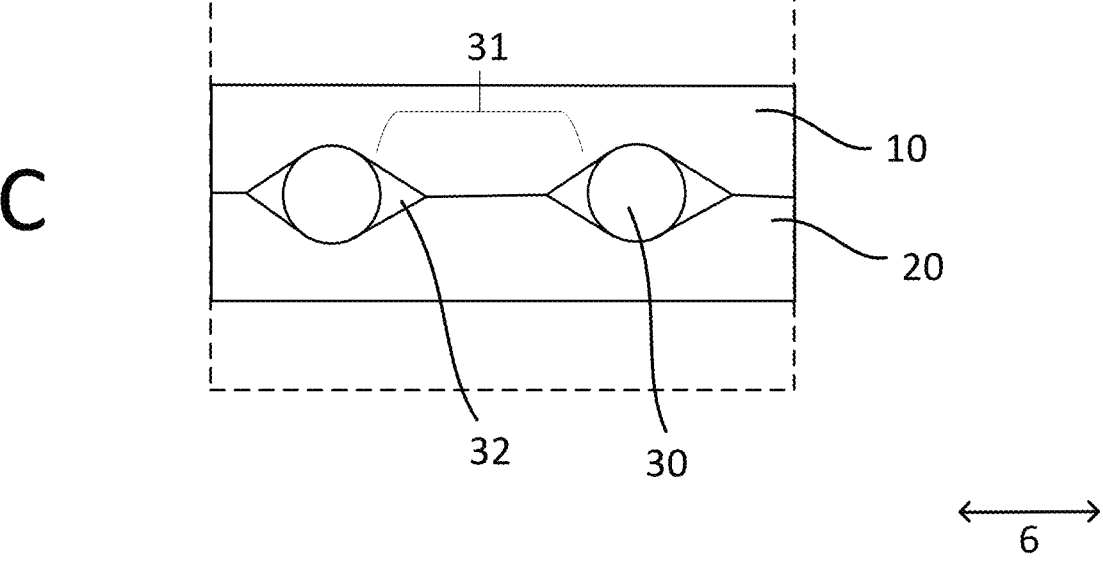

FIG. 4A is a schematic illustration of an exploded cross-sectional view along the longitudinal direction 6 of a flow-enhancing fabric 1 according to an embodiment of the present invention. The flow-enhancing fabric 1 comprises a first fibre layer 10 and a second fibre layer 20 configured to be arranged upon each other. The first fibre layer 10 has a first upper fibre surface 11 and a first lower fibre surface 12. In the same way, the second fibre layer 20 has a second lower fibre surface 21 and a second upper fibre surface 22. Furthermore, the flow-enhancing fabric 1 comprises a plurality of monofilaments 30 arranged between the first and second fibre layers 10, 20 along the transverse direction 8. The monofilaments 30 are arranged with a mutual spacing 31 between them.

FIG. 4B is a schematic illustration of a cross-sectional view along the longitudinal direction of the flow-enhancing fabric in FIG. 4A. The first fibre layer 10 and the second fibre layer 20 are arranged upon each other such that part of the first lower fibre surface 12 is in contact with part of the second upper fibre surface 21 and such that an upper fabric surface 2 of the flow-enhancing fabric 1 is also the first upper fibre surface 11 of the first fibre layer 10 and a lower fabric surface 4 of the flow-enhancing fabric 1 is the second lower fibre surface 22 of the second fibre layer 20.

The plurality of monofilaments 30 is arranged between the first and second fibre layers 10, 20 with a mutual spacing 31 between them. By arranging the monofilaments along a transverse direction 8 of the flow-enhancing fabric, between the first and second fibre layers 10, 20, a void 32 wherein fluid can flow is formed adjacent to the monofilaments 30, as illustrated in FIG. 3C (in an exaggerated way), which is a close-up of part of the flow-enhancing fabric 1 of FIG. 4B.

Figure 5:
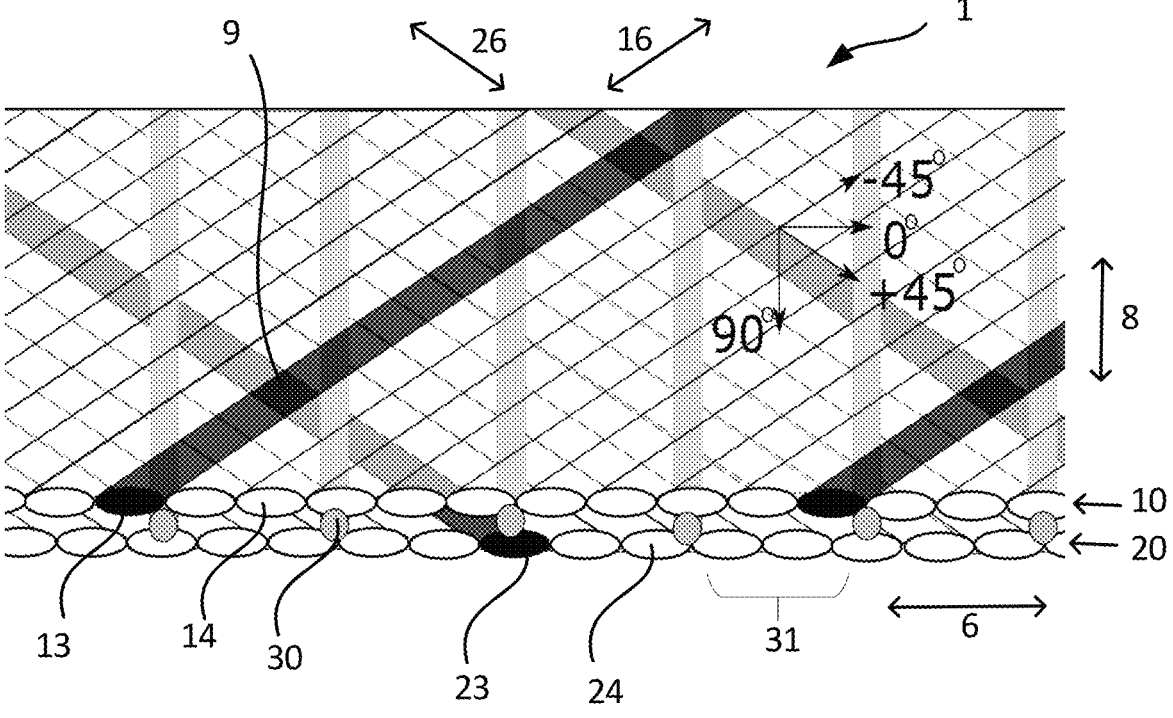
FIG. 5 is a schematic diagram illustrating a preferred embodiment of a flow-enhancing fabric according to the present invention.

FIG. 5 is a schematic illustration of a preferred embodiment of a flow-enhancing fabric 1 according to the present invention.

As can be seen in FIG. 5, the flow-enhancing fabric 1 extends in a longitudinal direction 6 and in a transverse direction 8. The fabric comprises a first fibre layer 10 and a second fibre layer 20 arranged upon each other. The first fibre layer 10 comprises a first plurality of fibre bundles oriented in parallel in a first fibre direction 16 and the second fibre layer 20 comprising a second plurality of fibre bundles oriented in parallel in a second fibre direction 26 different from the first direction. The white fibre bundles in the first fibre layer 10 are first glass fibre bundles 14 and the grey fibre bundles are first carbon fibre bundles 13. In the same way, the white fibre bundles in the second fibre layer 20 are second glass fibre bundles 24 and the grey fibre bundles are second carbon fibre bundles 23.

In FIG. 5, the first and second fibre layers 10, 20 each comprise a carbon fibre bundle for every ninth glass fibre bundle. However, the number of glass fibre bundles relative to carbon fibre bundles may be different in the first and/or the second fibre layer 10, 20.

In the preferred embodiment in FIG. 5, the angle between the first fibre direction 16 relative to the longitudinal direction 6 of the fabric is –45 degrees. Similarly, the angle between the second fibre direction 26 relative to the longitudinal direction 6 of the fabric is 45 degrees. Furthermore, the angle between the first and second fibre directions 16, 26 is 90 degrees. In this way, the first carbon fibre bundles 13 intersect and contact the second carbon fibre bundles 23 in a plurality of intersection points 9, allowing electrical conductivity through the flow-enhancing fabric 1 in the thickness direction. The fibre bundles 13, 14, 23, 24 may also be arranged at a different angle, as long as at least a number of first carbon fibre bundles 13 intersect and contact a number of second carbon fibre bundles 23.

The fabric further comprises a plurality of monofilaments 30 arranged between the first and second fibre layers 10, 20 along the transverse direction 8 of the fabric. As can be seen in FIG. 5, the plurality of monofilaments 30 each have a mutual spacing 31 between them. By having this spacing between the monofilaments 30, a void 32 on each side of the monofilaments 30 will be present, as shown in FIG. 4C, when the first and second fibre layers 10, 20 are compressed, allowing fluid to flow into the void 32 and through the flow-enhancing fabric 1 along the monofilaments 30 in the transverse direction 8.

Even though not visible in FIG. 5, the different fibres in the fabric may be maintained relative to each other by stitching and/or use of a binder and/or weaving.

The flow-enhancing fabric in FIG. 5 is configured to be used as an interlayer in a spar cap for a wind turbine blade. The flow-enhancing fabric 1 is configured to be arranged such that the longitudinal direction 6 of the flow-enhancing fabric 1 is substantially parallel with a length direction of a spar cap and such that the transverse direction 8 of the flow-enhancing fabric 1 is substantially parallel with a width direction of the spar cap.

Figure 6:
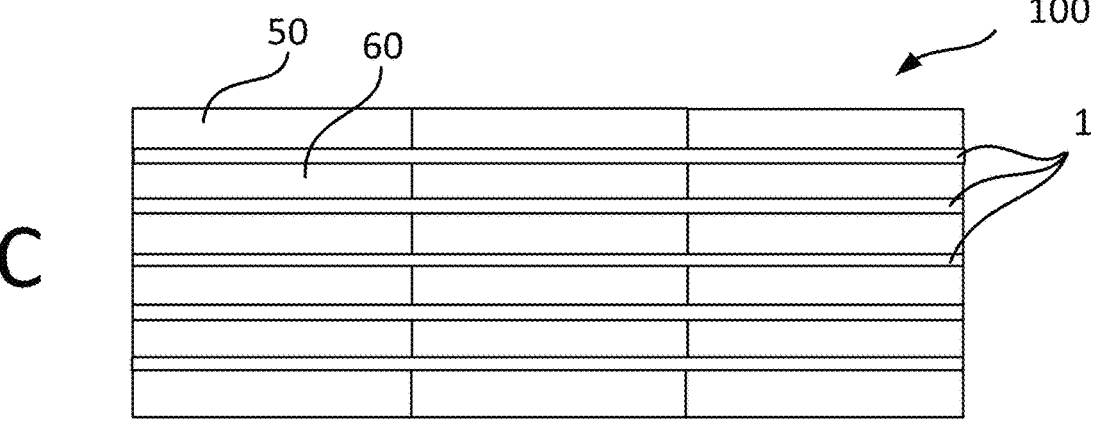
FIG. 6 is a schematic diagram illustrating a cross-sectional view of a flow-enhancing fabric arranged between precured fibre-reinforced elements.

FIGS. 6A and 6B are schematic illustrations of a cross-sectional view of a flow-enhancing fabric 1, such as that of FIG. 5, arranged between a first and a second precured fibre-reinforced element 50, 60. FIG. 6A is an exploded view, whereas FIG. 6B is an assembled view.

Figure 2:
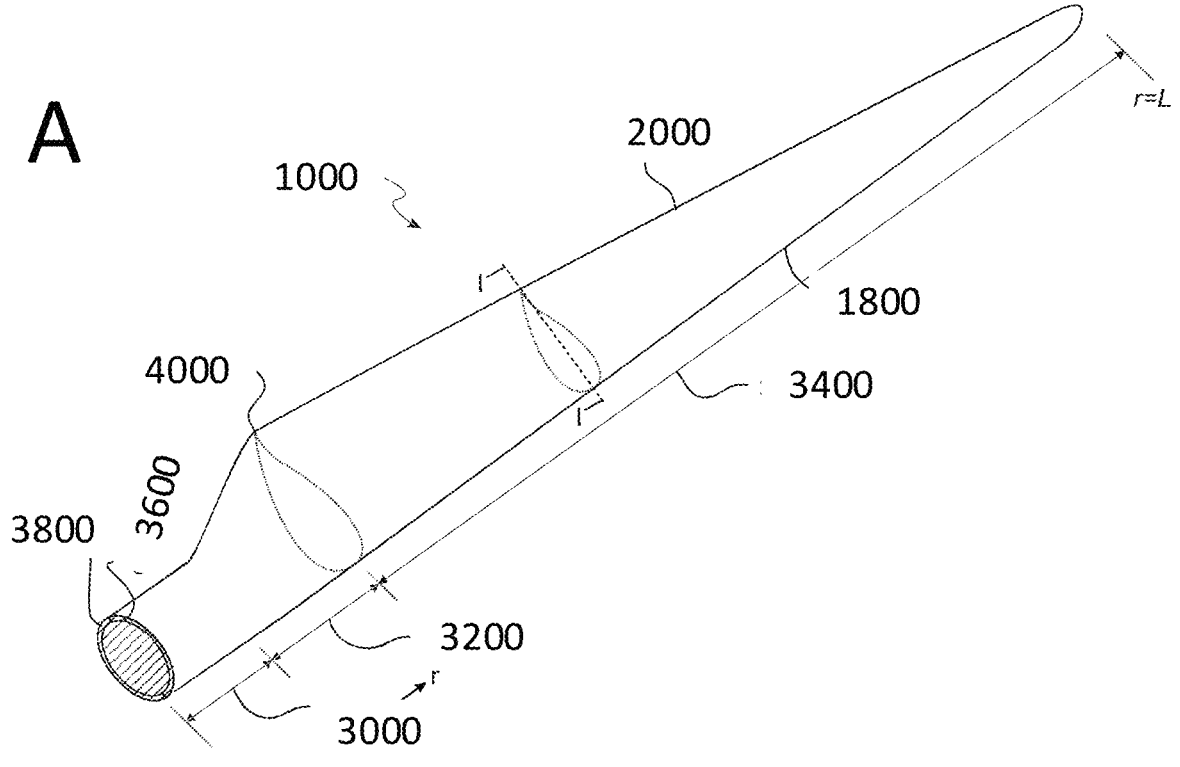
FIG. 2 is a schematic diagram illustrating a wind turbine blade and a spar cap structure arranged within the wind turbine blade.
Figure 2:
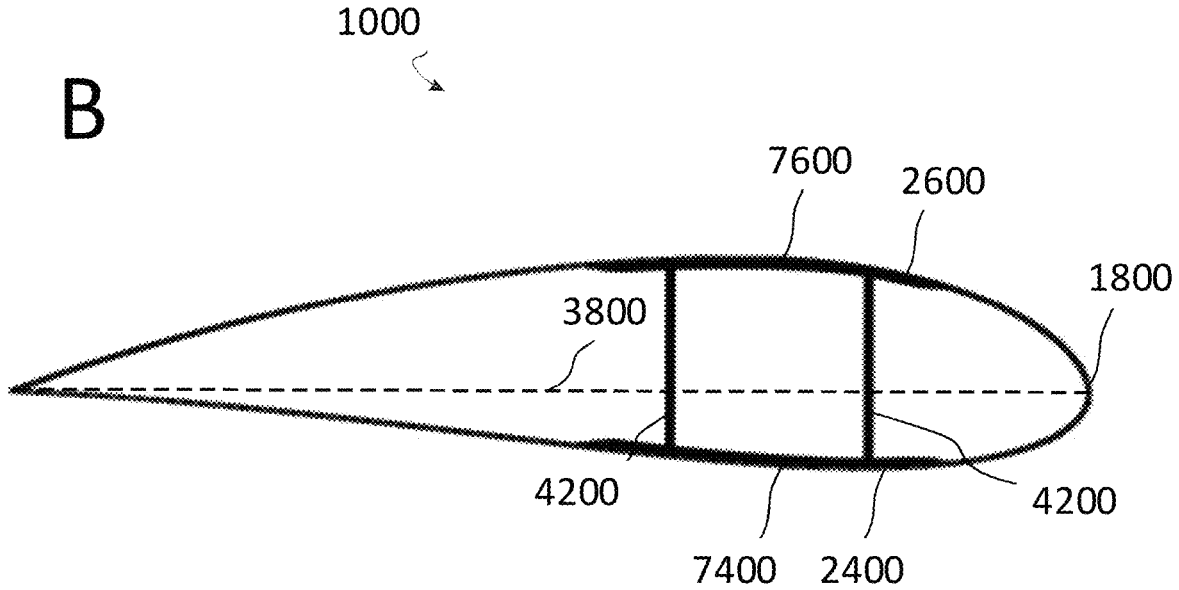

The first precured fibre-reinforced element 50 and the second precured fibre-reinforced element 60 are arranged such that a lower surface 52 of the first precured fibre-reinforced element 50 is facing a second upper surface 61 of the second precured element 60. A flow-enhancing fabric 1, such as the flow-enhancing fabric of FIG. 5, is arranged between the lower surface 52 of the first precured fibre-reinforced element 50 and the upper surface 61 of the second precured element 60, e.g. such that the upper fabric surface 2 is in contact with the first lower surface 52 of the first fibre-reinforced element 50 and the lower fabric surface 4 is in contact with the second upper surface 61 of the second fibre-reinforced element 60. The precured fibre-reinforced elements 50, 60 and the flow-enhancing fabric may form part of a spar cap 100 arranged in a wind turbine blade, such as the first and second spar caps 7400, 7600 of the wind turbine blade 1000 as illustrated in FIG. 2.

FIG. 6C is a schematic diagram illustrating a cross-sectional view of a fibre-reinforced composite material 100, e.g. spar cap or part of a spar cap 100, comprising a plurality of precured fibre-reinforced elements, including a first precured fibre-reinforced element 50 and a second precured fibre-reinforced element 60. The plurality of precured fibre-reinforced elements are arranged in an array with three rows of precured fibre-reinforced elements arranged adjacent to each other. Each row of precured fibre-reinforced elements are separated by a flow-enhancing fabric 1 according to the present invention. The fibre-reinforced composite material 100 may form part of a spar cap 100 arranged in a wind turbine blade, such as the first and second spar caps 7400, 7600 of the wind turbine blade 1000 as illustrated in FIG. 2. Although not specifically illustrated, flow-enhancing fabrics 1 may also be provided between adjacent precured fibre-reinforced elements in the width direction.

REFERENCE SIGNS 1 flow-enhancing fabric
2 upper fabric surface
4 lower fabric surface
6 longitudinal direction
8 transverse direction
9 intersection point
10 first fibre layer
11 first upper fibre surface
12 first lower fibre surface
13 first carbon fibre bundle
14 first glass fibre bundle
16 first fibre direction
20 second fibre layer
21 second upper fibre surface
22 second lower fibre surface
23 second carbon fibre bundle
24 second glass fibre bundle
26 second fibre direction
30 monofilament
31 spacing between monofilaments
32 void
50 first precured fibre-reinforced element
51 first upper surface
52 first lower surface
60 second precured fibre-reinforced element
61 second upper surface
62 second lower surface
100 spar cap
200 wind turbine
400 tower 600 nacelle
800 hub
1000 blade
1400 blade tip
1600 blade root
1800 leading edge
2000 trailing edge
2200 pitch axis
2400 pressure side
2600 suction side
3000 root region
3200 transition region
3400 airfoil region
3800 chord line
4000 shoulder/position of maximum chord
4200 shear webs
7400 first spar cap
7600 second spar cap

The invention claimed is:

1. A flow-enhancing fabric (1) extending in a longitudinal direction (6) and in a transverse direction (8), the fabric comprising a plurality of fibre layers including a first fibre layer (10) and a second fibre layer (20) arranged upon each other, the first fibre layer (10) comprising a first plurality of fibre bundles, the first plurality of fibre bundles comprising a plurality of first glass fibre bundles (14) and a number of first carbon fibre bundles (13), and the second fibre layer (20) comprising a second plurality of fibre bundles, the second plurality of fibre bundles comprising a plurality of second glass fibre bundles (24) and a number of second carbon fibre bundles (23), wherein the plurality of first glass fibre bundles (14) and the number of first carbon fibre bundles (13) of the first plurality of fibre bundles each extend parallel to one another in a first fibre direction (16), wherein the plurality of second glass fibre bundles (24) and the number of second carbon fibre bundles (23) of the second plurality of fibre bundles each extend parallel to one another in a second fibre direction (26), wherein the first fibre direction (16) is different from the second fibre direction (26), such that a number of the first carbon fibre bundles (13) intersect and contact a number of the second carbon fibre bundles (23), wherein the fabric further comprises a plurality of monofilaments (30) arranged between the first and second fibre layers (10, 20) along the transverse direction (8) of the fabric, the plurality of monofilaments (30) each having a mutual spacing (31) between them, and wherein the plurality of monofilaments (30) are arranged within a plane which is parallel to a plane in which the first fibre layer (10) is arranged and which is parallel to a plane in which the second fibre layer (20) is arranged.

2. The fabric (1) according to claim 1, wherein an angle between each of the first and second fibre directions (16, 26) relative to the longitudinal direction (6) of the fabric is in the range of 20-70 degrees.

3. The fabric (1) according to claim 1, wherein the first and/or second fibre layer (10, 20) comprises alternating glass fibre bundles (14, 24) and carbon fibre bundles (13, 23).

4. The fabric (1) according to claim 1, wherein the first and/or second fibre layer (10, 20) comprises a carbon fibre bundle (13, 23) for every Xth glass fibre bundle (14, 24), wherein X is in the range of 2-50.

5. The fabric (1) according to claim 1, wherein at least some of the fibres in the fabric are stitched together with one or more threads, such that the fibre bundles, including the first and second glass fibre bundles (14, 24) as well as the first and second carbon fibre bundles (13, 23), and the monofilaments (30) are maintained relative to each other by a stitching pattern and/or wherein at least some of the fibres in the fabric, including the first and second glass fibre bundles (14, 24) as well as the first and second carbon fibre bundles (13, 23), and the monofilaments (30) are maintained relative to each other by a binder.

6. The fabric (1) according to claim 1, wherein the monofilaments (30) are polymeric filaments.

7. The fabric (1) according to claim 1, wherein the first fibre layer (10) has a first upper fibre surface (11) and a first lower fibre surface (12) and wherein the second fibre layer (20) has a second lower fibre surface (22) and a second upper fibre surface (21) and wherein the first fibre layer (10) and the second fibre layer (20) are arranged upon each other such that at least part of the first lower fibre surface (12) is in contact with the second upper fibre surface (21).

8. The fabric (1) according to claim 1, wherein the fabric (1) has an upper fabric surface (2) and a lower fabric surface (4) and wherein the first upper fibre surface (11) is the upper fabric surface (2) and the second lower fibre surface (22) is the lower fabric surface (4).

9. The fabric (1) according to claim 1, wherein the area weight of the flow-enhancing fabric is in the range of 50-500 g/m$^2$.

10. A spar cap (100, 7400, 7600) for a wind turbine blade (1000) comprising a plurality of electrically conductive precured fibre-reinforced elements including a first precured fibre-reinforced element (50) and a second precured fibre-reinforced element (60), wherein the flow-enhancing fabric (1) according to claim 1 is arranged between the first precured fibre-reinforced element (50) and the second precured fibre-reinforced element (60).

11. The spar cap (100, 7400, 7600) according to claim 10, wherein each of the plurality of precured fibre-reinforced elements has a length in the longitudinal direction, a width in the transverse direction, and a height in a thickness direction, wherein the length is longer than the width and the width is longer than the height, wherein the first precured fibre-reinforced element (50) has a lower surface (52) and an upper surface (51) extending in the longitudinal direction and the width direction and the second precured fibre-reinforced element (60) has a lower surface (62) and an upper surface (61) extending in the longitudinal direction and the width direction, and wherein the first precured fibre-reinforced element (50) and the second precured fibre-reinforced element (60) are arranged such that the lower surface (52) of the first precured fibre-reinforced element (50) is facing the upper surface (61) of the second precured element (60), and wherein the flow-enhancing fabric (1) is being arranged between the lower surface (52) of the first precured fibre-reinforced element (50) and the upper surface (61) of the second precured element (60).

12. The spar cap (100, 7400, 7600) according to claim 10, wherein the flow-enhancing fabric (1) is arranged such that the longitudinal direction (6) of the flow-enhancing fabric (1) is substantially parallel with the length of the spar cap and the transverse direction (8) of the flow-enhancing fabric (1) is substantially parallel with the width of the spar cap.

13. The spar cap (100, 7400, 7600) according to claim 10, wherein the precured fibre-reinforced elements (50, 60) are pultruded carbon elements.

14. The spar cap (100, 7400, 7600) according to claim 10, wherein the spar cap is resin infused and wherein the thickness of the flow-enhancing fabric, when resin infused, is in the range of 0.2 mm-0.5 mm.

15. A wind turbine blade (1000) comprising the spar cap (100, 7400, 7600) according to claim 10.

16. A method of manufacturing a spar cap for the wind turbine blade according to claim 15, comprising the steps of:

providing a plurality of precured fibre-reinforced elements and a plurality of flow-enhancing fabrics;

arranging the plurality of precured fibre-reinforced elements to provide a desired spar cap structure, wherein the plurality of flow-enhancing fabrics are arranged between the plurality of precured fibre-reinforced elements to enhance resin flow between the plurality of precured fibre-reinforced elements;

infusing the spar cap structure with resin; and curing the resin to form the spar cap.

17. The method according to claim 16, wherein the spar cap is made in a spar cap mould and the method further comprises the steps of:

providing a spar cap mould, the spar cap mould comprising a moulding surface; and arranging the plurality of precured fibre-reinforced elements in the spar cap mould, and stacking them to provide a desired spar cap structure, wherein the plurality of flow-enhancing fabrics are arranged between the plurality of precured fibre-reinforced elements to enhance resin flow between the plurality of precured fibre-reinforced elements, or wherein the spar cap structure is made directly in a blade shell member mould.

18. A method of manufacturing a wind turbine shell member comprising the spar cap according to claim 10, comprising the steps of:

providing a blade shell member mould comprising a moulding surface and a moulding cavity;

arranging a number of fibre-reinforced elements within the blade shell member mould;

arranging a spar cap according to claim 1 on a spar cap area of the fibre-reinforced elements;

infusing the blade moulding cavity with resin; and curing the resin to form the blade shell member.

19. The method according to claim 18, wherein the spar cap is a pre-manufactured spar cap manufactured.

20. The method according to claim 18, wherein the spar cap is not pre-manufactured but is laid up directly in the blade mould.

21. The fabric (1) according to claim 1, wherein an angle between each of the first and second fibre directions (16, 26) relative to the longitudinal direction (6) of the fabric is in the range of 70-110 degrees.

* * * * *